(12) United States Patent
Gilgen et al.

(10) Patent No.: US 6,637,648 B1
(45) Date of Patent: Oct. 28, 2003

(54) CREDIT/DEBIT CARD FOR REGULATED TRANSACTIONS

(75) Inventors: Peter Gilgen, Findlay, OH (US); John D. Thompson, Findlay, OH (US); Peter V. Harridge, London (GB); Robert D. Harter, Bluffton, OH (US); Walter J. Sanders, Redmond, WA (US); Jeremy J. Sublett, Findlay, OH (US); William Kevin Thomson, Findlay, OH (US); Ronda L. Tendam, Bluffton, OH (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 10/028,861

(22) Filed: Dec. 20, 2001

Related U.S. Application Data
(60) Provisional application No. 60/257,658, filed on Dec. 21, 2000.

(51) Int. Cl.[7] .................................................. G06K 5/00
(52) U.S. Cl. ....................................... 235/380; 235/381
(58) Field of Search ................................. 235/380, 375, 235/376, 378, 381, 385, 487, 492, 493

(56) References Cited

U.S. PATENT DOCUMENTS

| | | | | |
|---|---|---|---|---|
| 3,786,421 A | * | 1/1974 | Wostl | ........................ 235/381 |
| 5,544,246 A | * | 8/1996 | Mandelbaum et al. | ....... 235/379 |
| 6,095,416 A | * | 8/2000 | Grant et al. | ................. 235/449 |
| 6,402,030 B1 | * | 6/2002 | Summers et al. | ........... 235/381 |

* cited by examiner

Primary Examiner—Daniel St. Cyr
(74) Attorney, Agent, or Firm—Emch, Schaffer, Schaub & Porcello Co., L.P.A.

(57) ABSTRACT

A method of doing business is disclosed which allows transactions in goods or services to be conducted in real time, with automatic changes as needed to comply with local rules or regulations. The method comprises storing, in a computer, at least one flag code associated with at least one of a locator code associated with locations having laws or rules which affect transactions within that geographic area and a transaction code associated with goods and services impacted by the laws or rules, confirming at the point of sale and at the time of sale if the transaction has a flag associated with it, collecting prior to, or at the time of sale, information from a consumer about their preferences for dealing with a transaction which is impacted by the local rule or regulation, and cross referencing flagged transactions with consumer preferences. The price, payment method or some other term of the transaction is adjusted as needed to comply with the local law or regulation. The business method facilitates offering discounts in gasoline, which are automatically reduced or changed to comply with local below cost sales rules.

10 Claims, 5 Drawing Sheets

REBATE DISCOUNT
PURCHASE GAS THEN RECEIVE REBATE AFTER THE SALE

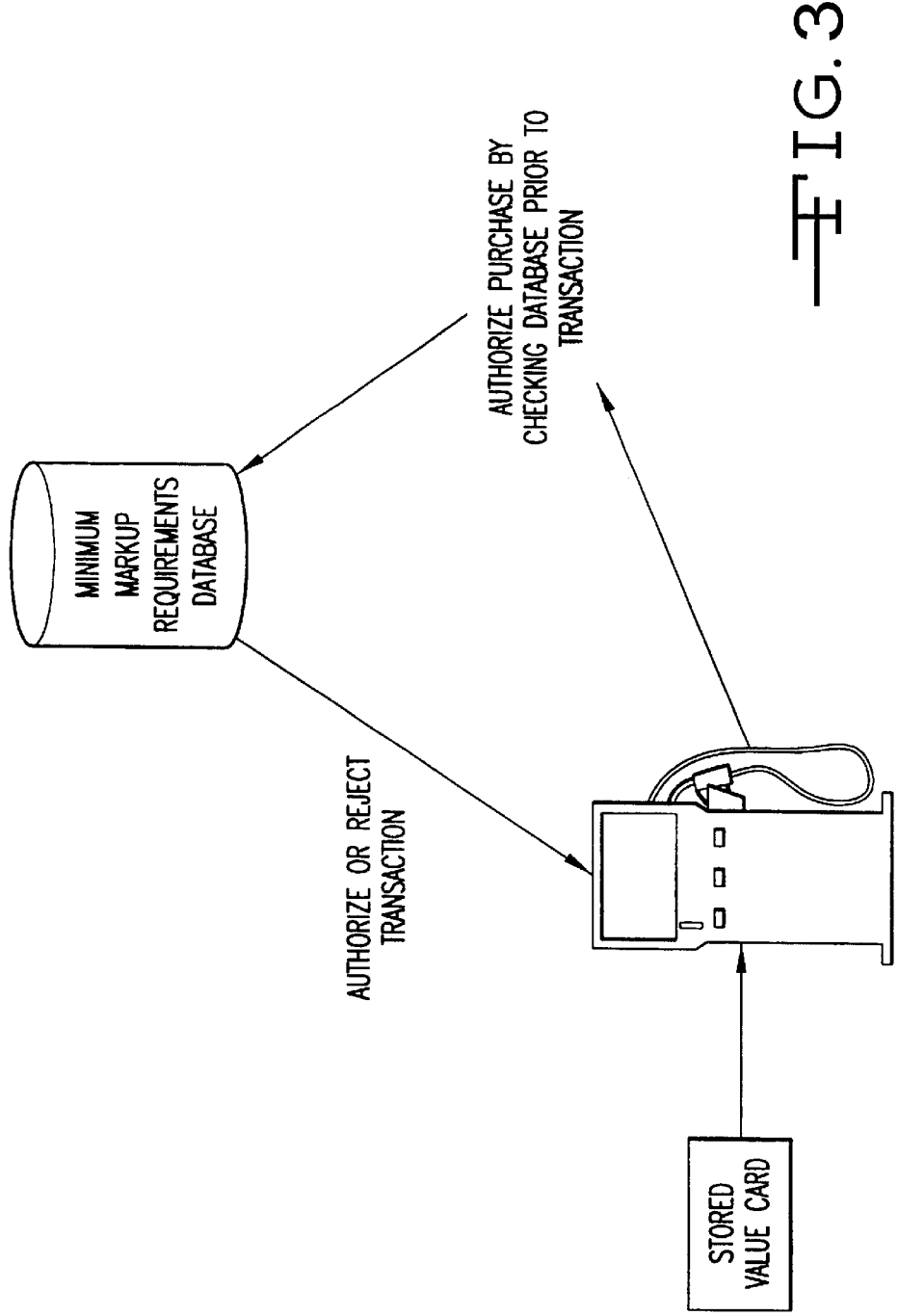

Figure 2 e-mail letter (Date of letter inserted)

(Name of consumer inserted)

(Consumer e-mail address inserted)

Dear: (Name of consumer inserted)

On (Date of transaction inserted), you purchased gasoline at the (Gasoline station name and address inserted). Did you realize that the gasoline price at the (Gasoline station name inserted) might have been lower if (State or local city name inserted) did not have laws prohibiting the sale of gasoline "below cost", thus prohibiting efficient gasoline vendors from reducing their prices. This information has both shocked and disappointed consumers.

Consumers often do not realize that such laws exist and many do not support their continued existence. Attached is a sample e-mail letter which you can use to contact (Formal title of legislator or organization official inserted) on below cost selling laws.

Sincerely, (Signature of company representative)

(Printed company name)

FIG. 4

Figure 3 e-mail letter (Date of letter inserted)

(Name of legislator [federal, state or local] or organization to be lobbied inserted)

(Recipient address inserted)

Dear: (Formal title of legislator or organization official inserted)

On (Date of transaction inserted), I purchased gasoline at the (Gasoline station name and address inserted). I was informed that the gasoline price at the (Gasoline station name inserted) might have been lower if (State or local city name inserted) did not have laws prohibiting the sale of gasoline "below cost", thus prohibiting efficient gasoline vendors from reducing their prices. This information both shocked and disappointed me. I did not realize that such laws existed and I do not support their continued existence.

Please advise me of your position on below cost selling laws. I urge you to fully investigate the existing below cost laws and sponsor legislation for their repeal.

Sincerely, (Signature space)

(Printed name inserted)

FIG. 5

CREDIT/DEBIT CARD FOR REGULATED TRANSACTIONS

CROSS-REFERENCE TO RELATED APPLICATIONS

This application claims the benefit of Provisional No. 60/257,658 filed on Dec. 21, 2000.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION (1) Field of the Invention

The present invention relates to a method of doing business using credit and/or debit cards to comply with local laws, regulations or customs, e.g., below cost sales legislation.

(2) Description of Related Art

Consumers use a lot of credit and debit cards. Representative credit and debit card patents are reviewed below, followed by a review of some problems which are encountered in transactions involving discounts or promotional credits in goods or services which are subject to laws, regulation or local custom.

U.S. Pat. No. 5,578,808 discloses a data card that can be used for transaction involving separate card issuers.

U.S. Pat. No. 5,544,246 discloses a smartcard that allows different Service Providers to coexist on the smartcard with none of the Service Providers, nor the owner of the smartcard, having access to the files created for, or by, each of the resident Service Providers.

U.S. Pat. No. 5,231,569 discloses a system for performing transactions from a checking account which adds a measure of assurance of payment to the account issuer. The system includes a remote transaction terminal, at the point of sale, which reads data on a card which identifies the card holder. The amount and type of the transaction are inputted into the transaction terminal. A transaction processor is provided which accesses two negative data files. One of the negative data files is compiled by the account issuer and the other of the negative data files is compiled by a number of account issuers such as by a number of different merchants. The data identifying the card holder is compared to the data in both of the negative files and an authorization or denial signal is generated in response to the comparison.

U.S. Pat. No. 5,340,969 to Cox discloses a method and apparatus for approving transaction card based transactions.

U.S.Pat. No. 5,270,943 to Warn discloses a fuel pump control card. U.S. Pat. No. 3,774,656 to Mayer discloses an automatic fuel dispensing nozzle.

U.S. Pat. No. 3,642,036 Ginsburgh et al. and several related patents, U.S. Pat. No. 3,580,414 and U.S. Pat. No. 3,536,109 discloses automatic dispensing of motor fuel.

The patent literature, and the consumer's world, are replete with art on, and invitations to use, credit, debit and pre-paid credit cards, which may hereafter be referred to as "plastic". Some issuers of plastic, in an attempt to secure greater market share, add discounts, promotional awards or bonus amounts for some or all purchases. Some credit cards feature a 5% credit towards purchase of a car, with an additional 5% credit for transactions such as purchase of a selected brand of gasoline. Some credit cards give cash back at the end of the year. Some card providers give discounts towards the purchase of other goods or services.

The proliferation of plastic has also been an enabler of e-commerce, permitting efficient purchases by consumers of goods over the Internet. Reverse auctions have been used in Internet transactions to permit consumers to name their own price for hotel rooms, airline tickets and even gasoline and pay for these items with plastic and use then some form of plastic to acquire some of the goods, e.g., gasoline.

Some vendors are concerned that discounted or promotional purchases of some goods, e.g., gasoline, can violate below cost selling rules that exist in some locales. Such laws are in effect in many states regards gasoline. Other goods subject to minimum price rules, in different locales, include milk, beer and wine, furniture and potentially even services, such as notarization in a state with a notary fee set by state law or sale of publications by a governmental body at a price set by statute.

None of the existing methods of handling debit and credit card transactions have adequately dealt with the problem of complying with these local regulations which impact the price of only some transactions and/or only those transactions which occur in some areas. Attempts to create an effective, nation-wide program involving discounts or rebates are frustrated if in some states the program can not legally be used, e.g., discount gasoline purchases may be legal in New York but illegal in New Jersey:

An obvious "solution" is to post notices at all the pumps in gas stations in New Jersey advising motorists that a certain promotion can not be used, but this introduces a significant complication for station owners in the affected state who must deal with disgruntled customers and for customers. In some cases, the disruption for customers can be significant, as where a customer was relying on a pre-paid gasoline card for a long trip.

We developed a way for credit and debit card purchases of goods or services impacted by regulations to proceed automatically, and, in some instances, invisibly, to both the vendor and the consumer at the point of sale.

Our approach solved the problem with a database of locations/transactions which were impacted by local rules or regulations. Another important element was maintaining, or updating in real time, a database of informed, consenting consumers, who had been advised, either generically or specifically, of the existence of restrictions. Most importantly, the consumers were given options, which may include consent to some alternate means of proceeding with the transaction which did not run afoul of the local rule or regulation.

BRIEF SUMMARY OF THE INVENTION

Accordingly, the present invention provides a method of doing business related to the purchase or lease of goods or services impacted by laws, regulation or custom (Impacted Transaction) with a credit, debit or prepaid card and fulfilling the transaction in real time at the point of sale (POS) and the time of sale (TOS) comprising:

(a) storing, in a memory location of a computer, at least one flag code associated with at least one member of the group of a locator code associated with locations having laws, regulations or customs which affect transactions of some goods or services within a geographic area and a transaction code associated with goods or services impacted by said laws, regulations or customs in some geographical areas;

(b) confirming, at the POS or in a remote location, and at the TOS if a transaction has a flag associated therewith;

(c) collecting, prior to or at the TOS, information from a consumer about preferences for dealing with Impacted Transactions, (d) cross-referencing, at the TOS and at the POS or in one or more remote computing locations operatively connected with a POS transaction means, said flagged transactions with said consumer choices and adjusting the price, payment method or some other term of the impacted transaction as needed to comply with said law, regulation or custom and fulfill the transaction in accordance with said consumer preferences.

In another embodiment, the present invention provides a method of providing a discounted, pre-paid gasoline card, or a credit card having associated therewith a promotional feature, discounts or promotions for gasoline which may not be permissible in a geographic area due to a local rule, regulation or custom, and fulfilling the transaction in real time at the point of sale (POS) and the time of sale (TOS) comprising:

(a) storing, in a memory location of a computer, at least one flag code associated with at least one member of the group of a locator code associated with locations having laws, regulations or customs which affect gasoline transactions within a geographic area and a transaction code associated with gasoline sales impacted by said laws, regulations or customs in some geographical areas;

(b) confirming, at the POS or in a remote location, and at the TOS if a transaction has a flag associated therewith;

(c) collecting, prior to or at the TOS, information from a consumer about preferences for dealing with impacted gasoline sales.

(d) cross-referencing, at the TOS and at the POS or in one or more remote computing locations operatively connected with a POS transaction means, said flagged transactions with said consumer choices and adjusting the price, payment method or some other term of the impacted transaction as needed to comply with said law, regulation or custom and fulfill the transaction in accordance with said consumer preferences.

BRIEF DESCRIPTION OF THE SEVERAL VIEWS OF THE DRAWINGS

FIG. 3 shows the business process flow when using a stored value card for gasoline.

FIG. 4 is an e-mail to be sent to a consumer when their proposed purchase has been impacted by a local law.

FIG. 5 is an e-mail letter that a consumer would send to an appropriate governmental body expressing concern about the ordinance or law.

DETAILED DESCRIPTION OF THE INVENTION

Figure 1:
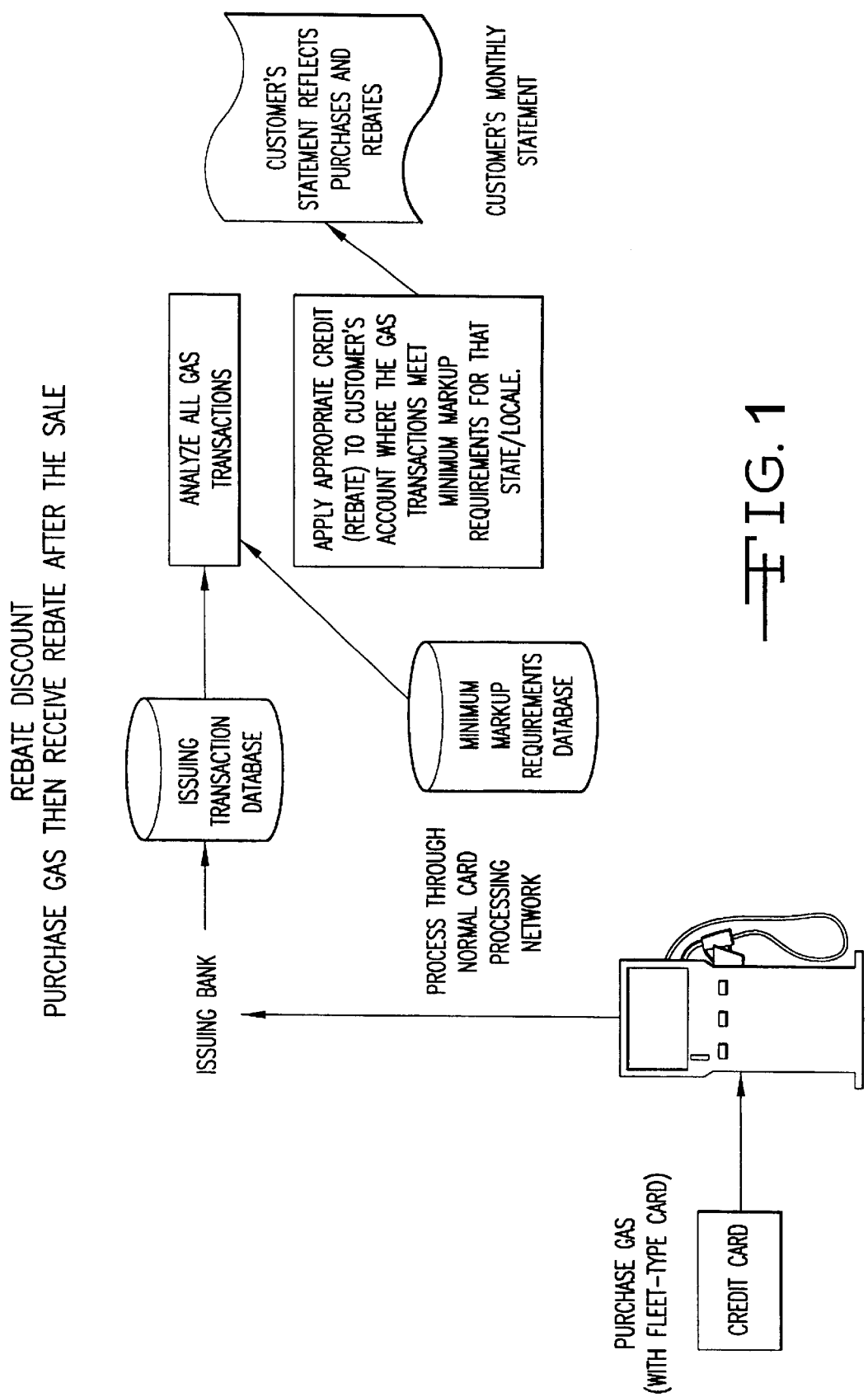
FIG. 1 is a simplified, schematic diagram showing use of a credit card, with rebate discount for gasoline purchases.
Figure 2:
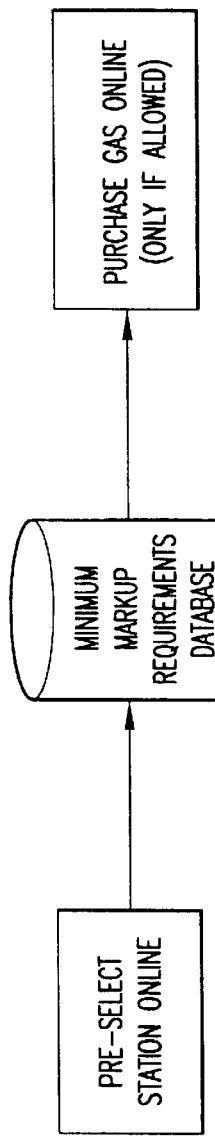
FIG. 2 shows the business transaction flow associated with a pre-paid gasoline card.
Figure 2:
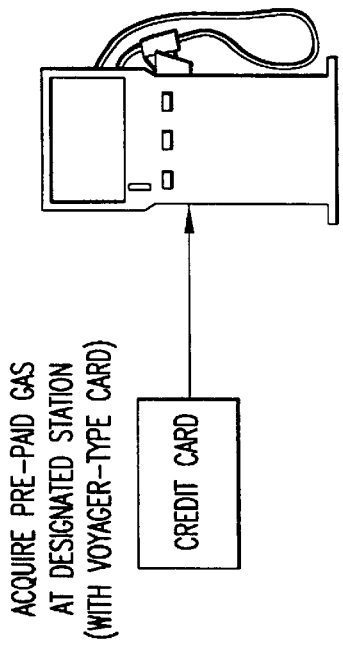

Many parts of the invention are conventional and detailed discussion thereof is not necessary. Credit, debit and pre-pay cards are well known and widely used. Myriad techniques are available for creating databases and allowing interactions between databases, vendors and consumers.

An essential element of the invention is creation of a database of "flagged" or impacted transactions, i.e., a transactions subject to some law, regulation or custom. This database is preferably keyed in to the location of the establishment selling the goods or services, but it is also possible to screen first on the type of transaction rather than where it occurs. Some gasoline vending examples will illustrate several approaches which may be used.

In order to comply with the legislation of New Jersey regards below cost gasoline sales, it may be necessary to investigate every transaction which occurs in New Jersey, then to investigate if the goods or services being sold are subject to state regulations. If the transaction occurs in New Jersey, the next step is reviewing the goods. If the goods are not regulated (dog food, fertilizer), the transaction is not flagged. If the goods are regulated (gasoline), the transaction is flagged. An alternate approach is to investigate the type of transaction first and identify those not subject to any rules or regulation (dog food, fertilizer). Only if transactions are in goods subject to laws in a state or municipality are they further reviewed to determine the applicability of a state law. Thus gasoline sales might be reviewed for location, and if a location regulated the price of the gasoline, then that transaction would be flagged. This would trigger consent review, either for pre-existing consent or automatically prompt for consent at the point of sale.

Transactions which are not flagged can be processed normally, no further interaction with the flagging database is required.

Normal processing of both types of transactions, non-impacted and flagged, may include conventional "plastic" processing steps such as review of credit limits, or amounts available, check for stolen cards, etc.

Transactions which are flagged will require informed consent to proceed or that the consumer be given the option to cancel the transaction. Informed consent is preferably pre-arranged but can be generated at the point of sale.

Pre-Arranged Informed Consent Informed consent, to proceed, can be given when the consumer sets up the initial credit or debit card. Depending on the nature of the goods and promotional incentives offered, the consent can be general (any goods impacted by any state law) or specific (gasoline in New Jersey).

The consumer can elect to proceed either at a price not in conflict with state law when a credit or debit card is used, with discounts or promotional incentives reduced or eliminated as necessary to comply with state law. When a pre-paid gasoline card is used, with, e.g., a 5% or 10% discount on the purchase price with the card being usable for gasoline purchases at the posted retail price, the consumer would also have the option of diverting the "flagged" gasoline purchase to another credit card or debit card, preserving the amount available for purchase on the pre-paid gasoline card.

Point Of Sale (POS) Consent While informed consent is preferably built into the database set up when the consumer purchases, e.g., the pre-paid gasoline card, it may also be given at the point of sale. Thus, where a gasoline service station has relatively smart pumps, the consumer may be informed at the pump that state minimum price laws require that a surcharge of 5.55% or 11.11% will be added to amount withdrawn from or charged to the debit card to comply with the law. At this point the consumer would also have the option to provide another credit or debit card which would, prospectively, automatically be charged the "list" price for impacted gasoline or to cancel the transaction and start over with cash or use another credit or debit card.

In a preferred POS method of obtaining informed consent, the customer has the option to:

Stop (and start over with cash or other plastic or walk away), or

Proceed with the pre-paid card, with a surcharge or without promotional extras to the extent needed to comply with a state's minimum price laws, or Proceed with the transaction, but temporarily or permanently modify her database so that another credit or debit card is charged the "official minimum price", leaving the full amount of the prepaid gallons or prepaid value of the prepaid gasoline card available for use in less regulated locales.

IMPACTED TRANSACTIONS

While much of the discussion above has been centered on laws regulating sales of gasoline, the present invention is applicable to any transaction which is impacted by any law, regulation or even custom.

Transactions might include the sale of dairy products or furniture or any goods now, or heareafter, subject to price or other regulation. Services may now, or hereafter, be subject to minimum price restrictions, such as admissions to parks or recreational areas which are owned by public bodies. Notary fees are, in some areas, set by state law.

While most restrictions are likely to be state laws, there may be local options which affect the price or even the purpose of a purchase. Some municipalities impose restrictions on sales of smoking supplies which can be used either for smoking of illegal drugs or for tobacco. To comply with the local ordinance, sales of such goods may trigger an inquiry at the POS, or require having previously on file, a declaration by the purchaser that the products are not intended for use with illegal drugs. In this case the primary beneficiary would be the store owner, who would have additional proof that she did not sell her double wide rolling paper or water pipe for an illegal purpose.

We claim:

1. A method of doing business related to purchase or lease of goods or services impacted by laws, regulation or custom (impacted Transaction) with a credit, debit or prepaid card and fulfilling a transaction in real time at the point of sale (POS) and a time of sale (TOS) comprising:

(a) storing, in a memory location of a computer, at least one flag code associated with at least one member of a group of a locator code associated with locations having laws, regulations or customs which affect transactions of goods or services within a geographic area and a transaction code associated with goods or services impacted by said laws, regulations or customs in geographic areas;

(b) confirming, at the POS or in a remote location, and at the TOS if the transaction has a flag associated therewith;

(c) collecting, prior to or at the TOS, information from a consumer about preferences for dealing with Impacted Transactions;

(d) cross-referencing, at the TOS and at the POS or in one or more remote computing locations operatively connected with the POS transaction means, said flagged transactions with said consumer choices and adjusting a price or payment method of the impacted transaction as need to comply with said law, regulation or custom and fulfill the transaction in accordance with said consumer preferences.

2. The method of claim 1 wherein the impacted transaction is a minimum sale price.

3. The method of claim 1 wherein the impacted transaction is sale of gasoline in a state with minimum sales prices or below cost legislation wholly or partially preventing discounts or promotional incentives on such sales.

4. The method of claim 1 wherein said consumer preference information is acquired at the time of acquiring said credit, debit or prepaid card.

5. The method of claim 1 wherein at least one of said consumer preference information is acquired at TOS and POS in response to an inquiry generated by occurrence of a flagged transaction.

6. The method of claim 1 wherein said consumer preference includes, and the POS transaction means has capability to accept, payment for the impacted transaction using a different credit, debit or pre-paid card the use of which is not impacted by said law, regulation or custom.

7. The method of claim 1 wherein said consumer is advised at the time of purchase that a transaction has been impacted by a law, regulation or custom.

8. The method of claim 7 wherein said consumer is given an option to proceed with a non-impacted payment method or cancel.

9. The method of claim 8 wherein said consumer has an option to enter, at the point of sale terminal, a new, continuing preference to proceed with an alternative, non-impacted payment method.

10. A method of providing a discontinued, pre-paid gasoline card, or a credit card having associated therewith a promotional feature, discounts or promotions for gasoline which may not be permissible in a geographic area due to a local rule, regulation or custom, and fulfilling a transaction in real time at a point of sale (POS) and a time of sale (TOS) comprising:

a) storing, in a memory location of a computer, at least one flag code associate with at least one member of a group of a locator code associated with locations having laws, regulations or customs which affect gasoline transactions within a geographic area and a transaction code associated with gasoline sales impacted by said laws, regulations or customs in some geographical areas;

b) confirming, at the POS or in a remote location, and at the TOS if the transaction has a flag associated therewith;

c) collecting, prior to or at the TOS, information from a consumer about preferences for dealing with impacted gasoline sales;

d) cross-referencing, at the TOS and at the POS or in one or more remote computing locations operatively connected with a POS transaction means; said flagged transactions with said consumer choices and adjusting a price or payment method of an impacted transaction as needed to comply with said law, regulation or custom and fulfill the transaction in accordance with said consumer preferences.

* * * * *